United States Patent
Inada (10) Patent No.: US 10,611,562 B2
(45) Date of Patent: Apr. 7, 2020

(54) LIQUID STORAGE SYSTEM AND METHOD OF SUPPLYING NONFLAMMABLE GASES IN THE SAME

(71) Applicants: Kabushiki Kaisha Toshiba, Minato-ku (JP); Toshiba Energy Systems & Solutions Corporation, Kawasaki-shi (JP)

(72) Inventor: Yohei Inada, Kawasaki (JP)

(73) Assignees: Kabushiki Kaisha Toshiba, Minato-ku (JP); Toshiba Energy Systems & Solutions Corporation, Kawasaki-shi (JP)

( * ) Notice: Subject to any disclaimer, the term of this patent is extended or adjusted under 35 U.S.C. 154(b) by 87 days.

(21) Appl. No.: 15/942,748

(22) Filed: Apr. 2, 2018

(65) Prior Publication Data

US 2019/0077591 A1   Mar. 14, 2019

(30) Foreign Application Priority Data

Sep. 11, 2017   (JP) .................................. 2017-173794

(51) Int. Cl.
   B65D 90/44   (2006.01)
   B65D 90/34   (2006.01)
   (Continued)

(52) U.S. Cl.
   CPC ............ B65D 90/44 (2013.01); B65D 90/34 (2013.01); B65D 90/48 (2013.01); G05D 16/16 (2013.01); *Y10T 137/3127* (2015.04)

(58) Field of Classification Search
   CPC ........ B65D 90/44; B65D 90/48; B65D 90/34; G05D 16/16
   (Continued)

(56) References Cited

U.S. PATENT DOCUMENTS 3,501,049 A   3/1970 Ediger et al.
3,880,179 A * 4/1975 Lenz ..................... B01J 8/0025
                                                        137/14
(Continued)

FOREIGN PATENT DOCUMENTS

DE   603 16 694 T2   7/2008
EP   1 772 158 A2   4/2007
(Continued)

OTHER PUBLICATIONS

Extended European Search Report dated Oct. 19, 2018 in corresponding European Patent Application No. 18167487.0 citing documents AA, AO-AQ therein, 8 pages.
(Continued)

*Primary Examiner* — Umashankar Venkatesan
(74) *Attorney, Agent, or Firm* — Oblon, McClelland, Maier & Neustadt, L.L.P.

(57) ABSTRACT

According an embodiment, a liquid storage system comprises a tank for storing liquid fuel, a vent pipe for providing communication between outside of the tank and a gas space above a level of liquid fuel in the tank, a nonflammable gas supplying apparatus for supplying the gas space with nonflammable gases, a pressure control apparatus installed in the vent pipe to operate responsively to the pressure difference between the gas space and atmospheric pressure so as to limit a pressure in the gas space to a predetermined range. The pressure control apparatus introduces ambient air outside the tank into the gas space through the vent pipe when a pressure in the gas space is lower than a predetermined lower limit, and discharge a gas from the gas space out of the tank through the vent pipe when a pressure in the gas space is higher than a predetermined upper limit.

12 Claims, 6 Drawing Sheets

(51) Int. Cl.
*B65D 90/48* (2006.01)
*G05D 16/16* (2006.01)

(58) Field of Classification Search
USPC .................................................. 137/208, 209
See application file for complete search history.

(56) References Cited

U.S. PATENT DOCUMENTS

| | | | |
|---|---|---|---|
| 6,568,415 B2 | 5/2003 | Nakahara et al. | |
| 6,634,598 B2 * | 10/2003 | Susko | B64D 37/32 137/209 |
| 7,296,586 B2 | 11/2007 | Hosoda | |
| 8,689,994 B2 * | 4/2014 | Pashcow | F16K 31/18 116/109 |
| 8,720,483 B2 * | 5/2014 | Thorwesten | B65D 90/022 137/316 |
| 2004/0046670 A1 | 3/2004 | Adams et al. | |
| 2010/0263738 A1 * | 10/2010 | Taylor | F16K 17/196 137/209 |
| 2018/0105411 A1 | 4/2018 | Stuart | |

FOREIGN PATENT DOCUMENTS

| | | |
|---|---|---|
| EP | 1 772 158 A3 | 4/2007 |
| GB | 2536928 A | 10/2016 |
| JP | 52-140018 | 11/1977 |
| JP | 57-133882 | 8/1982 |
| JP | 61-14958 Y2 | 5/1986 |
| JP | 06-506900 | 8/1994 |
| JP | 2007-91234 A | 4/2007 |
| JP | 2008-230685 | 10/2008 |
| JP | 2008-241022 | 10/2008 |
| JP | 2009-120204 A | 6/2009 |
| JP | 2011-105266 | 6/2011 |
| WO | WO 93/012373 A1 | 6/1993 |

OTHER PUBLICATIONS

"Quick reference of hazardous materials facility standards (2)," Tokyo Institute of Informatics, Feb. 1, 2013, Edited by Hazardous Materials Administration Study Group, 42 Pages (with English Translation).

* cited by examiner

LIQUID STORAGE SYSTEM AND METHOD OF SUPPLYING NONFLAMMABLE GASES IN THE SAME

CROSS-REFERENCE TO RELATED APPLICATION

This application is based upon and claims the benefit of priority from Japanese Patent Application No. 2017-173794 filed on Sep. 11, 2017; the entire contents of which are incorporated herein by reference.

FIELD

The embodiments of this invention relate to a technique for controlling the pressure and oxygen concentration in a gas space vertically above the level in a tank that stores liquid.

BACKGROUND

Tanks for storing liquid include a so-called liquid tank for storing water or flammable oils such as gasoline and diesel fuel. Such tanks store liquid therein. The liquid is pumped to outside of the tank through piping or the like, if desired. At times, in the tank, the position of the gas-liquid interface (namely, liquid level) lowers. The volume of a gas space vertically above the liquid level in the tank increases with lowering in the liquid level. In the case that the space in the tank is closed, the pressure in the gas space decreases as the liquid level moves vertically downwardly. When the pressure in the gas space reaches a value close to the vacuum, it becomes difficult to pump the liquid from the tank to outside of the tank.

For this reason, a tank for liquid generally has a vent pipe to provide communication between the above-mentioned gas space and the space outside the tank (namely, atmosphere). By introducing the air outside the tank into the gas space through the vent pipe, it is possible to bring the pressure in the gas space close to ambient atmospheric pressure. By suppressing the reduction of pressure in the gas space, it becomes easy to pump the liquid below the gas space to outside of the tank.

Such vent pipes include a so-called "non-valve vent pipe" that provides constant communication between the gas space in the tank and the atmosphere surrounding outside the tank. In the case that the tank stores a highly volatile liquid therein, a so-called "vent pipe with atmospheric valve" is employed, equipped with a valve operated responsive to a pressure difference between the gas space and ambient atmosphere (See, Hazardous Materials Administration Study Group edited, "Quick reference of hazardous materials facility standards (2)", Tokyo Institute of Informatics, Feb. 1, 2013, p. 261-263). Such atmospheric valves include a check valve that allows the flow of air from outside of the tank into the gas space and that stops the flow of the gas from the gas space to outside of the tank, for example, a vacuum relief valve.

Such tanks for liquid are typically made of metal. When the gas space in the tank is constantly communication with the atmosphere through a non-valve vent pipe, air containing oxygen enters the gas space through the vent pipe, to be able to form metal corrosion on the inner surface of the tank. In the case in which flammable liquid is stored in the tank, the presence of oxygen exceeding a predetermined concentration might cause the gas in the tank to catch fire.

It is desirable to reduce oxygen concentration as much as possible in the gas space in order to prevent such metal corrosion on the inner surface of the tank or catching fire of flammable liquid stored in the tank. There is an example to prevent the gas in the tank from catching fire by supplying an inert gas (for example, carbon dioxide) having a specific gravity larger than that of air into the tank and forming a layer of an inert gas vertically above the liquid level of the flammable liquid.

However, in the example, the space vertically above the layer of inert gas (shield layer) in the gas space in the tank is in communication with the atmosphere outside the tank, and filled with air containing oxygen. It is difficult to prevent metal corrosion in the portion of the tank inner surface vertically above the layer of inert gas. A volatile gas having a smaller specific gravity than that of air may fill a portion of the gas space vertically above the layer of the inert gas in the tank. The volatile gas might react with the oxygen entered the gas space to catch fire.

It is difficult to completely prevent metal corrosion and catching fire in the tank by merely supplying an inert gas to the gas space in the liquid tank. There is a demand for bringing the oxygen concentration in the gas space as close to zero as possible. Further, there is a demand for maintaining the pressure in the gas space to the desired range close to ambient atmospheric pressure, in order to facilitate pumping of the liquid stored in the tank.

DETAILED DESCRIPTION

Embodiments of the present invention, is made in view of the above circumstances. It is an object of the embodiments to provide a liquid storage system for bringing the oxygen concentration in a gas space close to zero while maintaining the pressure of the gas space in a tank within a desired range.

According to an embodiment, there is provided a liquid storage system comprising: a tank for storing liquid fuel therein, a vent pipe for providing communication between outside of the tank and a gas space vertically above a level of liquid fuel in the tank, a nonflammable gas supplying apparatus for supplying the gas space with nonflammable gases, a pressure control apparatus installed in the vent pipe to operate responsively to the pressure difference between the gas space and ambient atmospheric pressure so as to limit a pressure in the gas space to a predetermined range including ambient atmospheric pressure, wherein the pressure control apparatus introduces ambient air outside the tank into the gas space through the vent pipe when a pressure in the gas space is lower than or equal to a predetermined lower limit by gauge pressure, and discharge a gas from the gas space out of the tank through the vent pipe when a pressure in the gas space is higher than or equal to a predetermined upper limit by gauge pressure.

Specifically, the pressure control apparatus incorporates: a vacuum relief valve that is a check valve for allowing a flow of air from outside the tank to the gas space and for stopping a flow of gas from the gas space to outside of the tank in the vent pipe; a pressure relief valve that is a check valve for allowing a flow of gas from the gas space to outside of the tank and for stopping a flow of air from outside the tank to the gas space in the vent pipe; and wherein the vacuum relief valve and the pressure relief valve are normally closed valves which are closed when the pressure of the gas space is within the predetermined range; the vacuum relief valve is open to introduce air outside of the tank into the gas space when the pressure in the gas space is lower than or equal to the lower limit, and the pressure relief valve is open to discharge gas from the gas space to outside of the tank when the pressure in the gas space is higher than or equal to the upper limit.

According to another embodiment, there is provided a method of supplying nonflammable gases to the gas space in the tank in the liquid storage system, wherein the liquid storage system comprises: a tank for storing liquid fuel therein, a vent pipe for providing communication between outside of the tank and a gas space vertically above a level of liquid fuel in the tank, a nonflammable gas supplying apparatus for supplying the gas space with nonflammable gases, a pressure control apparatus installed in the vent pipe to operate responsively to the pressure difference between the gas space and ambient atmosphere so as to limit the pressure in the gas space to a predetermined range including ambient atmospheric pressure, and wherein the noncombustible gas supplying apparatus supply the gas space with nonflammable gases in any one or combination of the cases including: a case where the liquid level of a liquid stored in the tank decreases, a case where that the oxygen concentration in the gas space is higher than a predetermined normal range, a case where the position of a level in the tank is lower than a predetermined normal range, and a case where the air outside the tank is introduced into the gas space through the vent pipe by the pressure control apparatus.

Hereinafter, the present invention is described in detail with reference to drawings. Meanwhile, the present invention is not limited by this embodiment. Also, the following embodiment includes components easily conceivable by one skilled in the art or substantially identical components.

First Embodiment (Schematic Configuration of Liquid Storage System)

Figure 1:
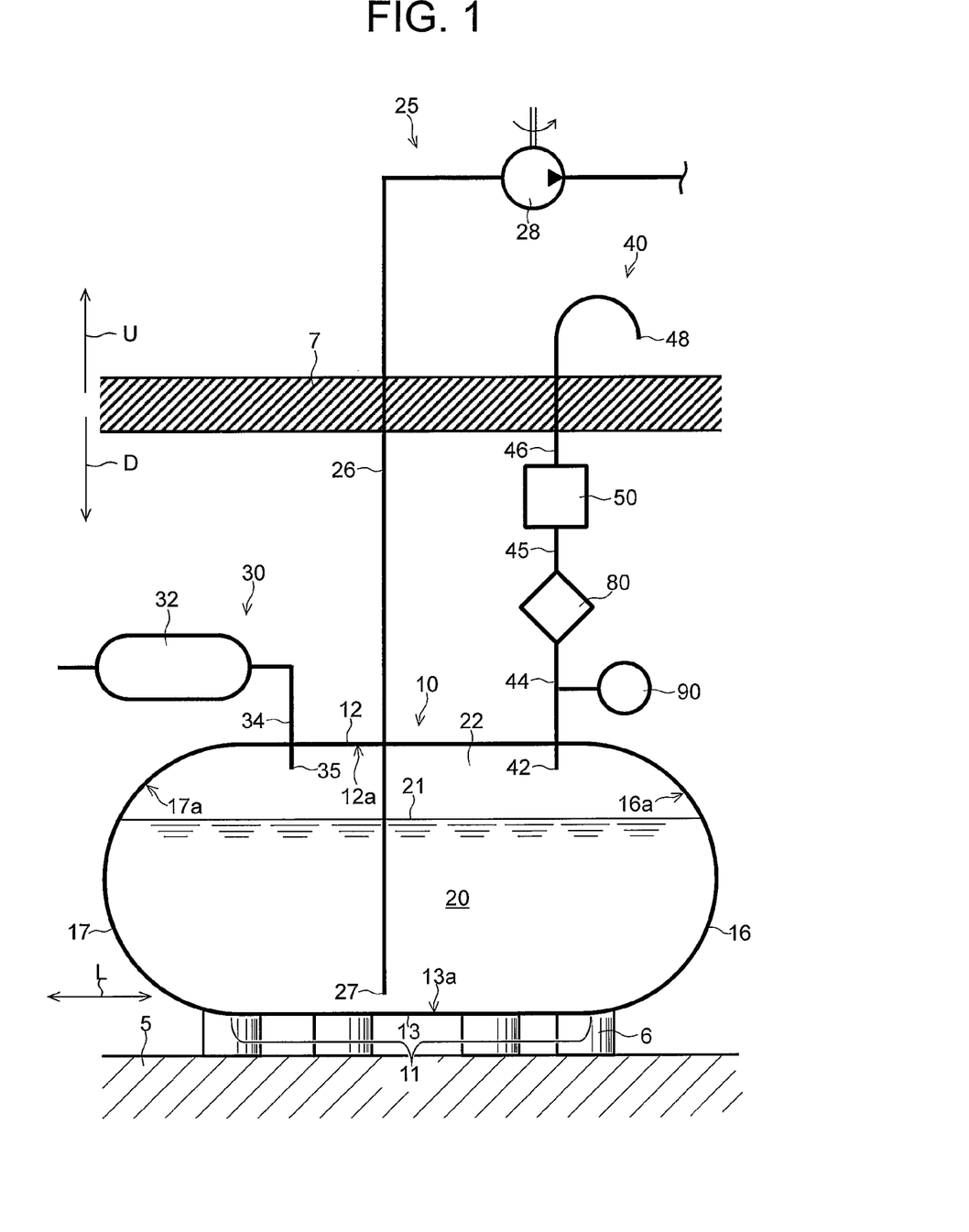
FIG. 1 is a schematic diagram of the liquid storage system according to a first embodiment, and shows a longitudinal section of a liquid tank.
Figure 2:
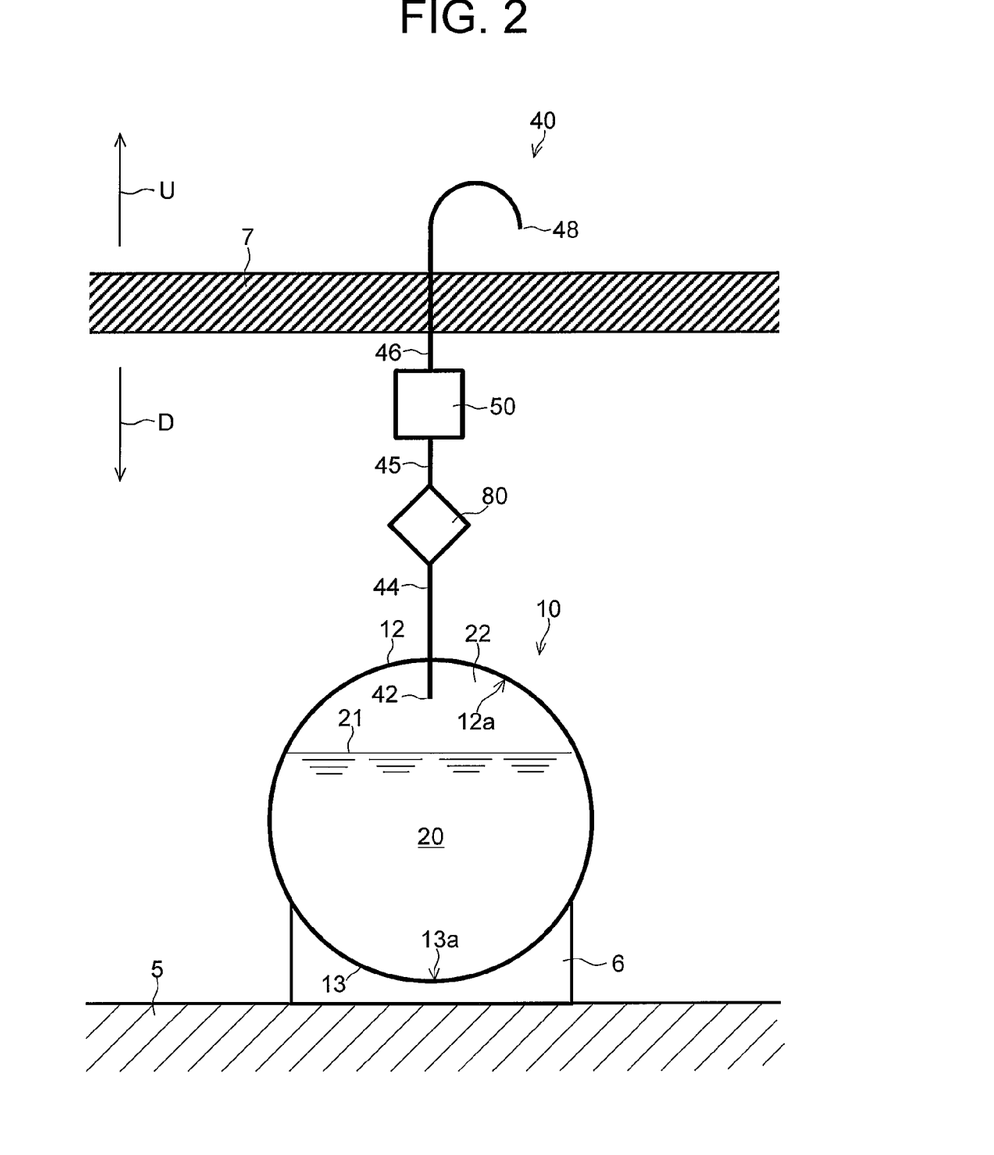
FIG. 2 is a schematic diagram of the liquid storage system according to the first embodiment, and shows a cross section of the liquid tank.

First, a liquid storage system according to this embodiment is described with reference to FIGS. 1 and 2. FIG. 1 is a schematic diagram of a liquid storage system of this embodiment, and shows a longitudinal section of a liquid tank. FIG. 2 is a schematic diagram of the liquid storage system of this embodiment, and shows a cross section of the liquid tank. In FIG. 1 and FIG. 2, upward (or upwardly) in the vertical direction is indicated by arrow U, and downward (or downwardly) in the vertical direction is indicated by arrow D.

As shown in FIGS. 1 and 2, the liquid storage system according to this embodiment has a liquid tank (simply referred to as a tank) 10 capable of storing liquid therein, and an apparatus (referred to as a liquid pumping apparatus) 25 for pumping liquid fuel 20 stored in the tank to outside of the tank 10. In addition, the liquid storage system has an apparatus (referred to as a nonflammable gas supplying apparatus) 30 for supplying the tank 10 with nonflammable gases, and a vent pipe 40 for providing communication between the space outside of the tank 10 and the gas space 22 vertically above a level 21 of liquid fuel 20 stored in the tank 10. In this embodiment, the space outside of the tank 10 is the space in which air of ambient atmospheric pressure, so-called ambient air exists. The liquid pumping apparatus 25 pumps the liquid fuel 20 into a tank provided in a vehicle or a fuel dispenser (not shown).

The tank 10 is disposed in a pit formed on a vertically downward of a ground level, and is configured as a so-called underground liquid tank. Specifically, the tank 10 is disposed between a foundation 5 and a roof 7 of the underground pit. The roof 7 may be disposed vertically above or below the ground level. A plurality of supporting legs 6 are arranged and spaced one from the other on the foundation 5 of the underground pit. The tank 10 is disposed on these supporting legs 6 to be supported by the supporting legs 6. The tank 10 under the ground level can store volatile and/or flammable liquids such as oils and liquid fuels. The tank 10 stores a highly volatile liquid fuel, specifically, diesel fuel.

As shown in FIGS. 1 and 2, the tank 10 has a substantially cylindrical shape, and includes a portion (referred to as a body portion) 11 extending in the longitudinal direction indicated by an arrow L in FIG. 1. The tank 10 includes portions (referred to as mirror portions) 16 and 17 disposed outwardly of the body portion 11 in the longitudinal direction L, each having a hemispherical shape. As shown in FIG. 2, a cross section of the body portion 11 is annular. The vertically upward portion 12 and the vertically downward portion 13 of the body portion 11 of the tank 10 are denoted as "top portion" and "bottom section", respectively.

Inner surface 13a of the bottom portion 13 of the tank 10 is in physical contact with liquid fuel 20. There is a space 22 filled with gas, a so-called gas space 22, vertically above the level 21 of liquid fuel stored in the tank 10. Inner surface 12a of the top portion 12 faces the gas space 22 and is in contact with gases. The gases in the gas space 22 contain flammable gases which consist of volatile constituents of liquid fuel 20 in the tank 10.

Inner surface 16a of the mirror portion 16 is connected to the inner surface 12a of the top portion 12 and the inner surface 13a of the bottom portion 13 at one end in the longitudinal direction. The surface 16a is continuous with these inner surfaces 12a and 13a. Inner surface 17a of the mirror portion 17 is connected to the inner surface 12a of the top portion 12 and the inner surface 13a of the bottom portion 13 at the other end, namely, at the opposite end to the mirror portion 16 in the longitudinal direction. Inner surface 17a is continuous to these inner surfaces 12a and 13a. The inner surfaces 16a and 17a of the mirror portions 16 and 17 partly faces the gas space 22, respectively. The tank 10 can withstand relatively high internal pressures. The ratio of the gas space 22 to the internal volume of the tank 10 preferably ranges from 5 to 10%.

The liquid fuel stored in the tank 10 is delivered to outside of the tank 10 by the liquid pumping apparatus 25. The liquid pumping apparatus 25 has a conduit (namely, feed tube) 26 extending through the tank 10 and a pump 28 installed in the conduit 26. The conduit 26 has an inlet 27 inside the tank 10 for sucking the stored liquid at one end. The inlet 27 is disposed vertically downward in the tank 10.

Specifically, the inlet 27 is disposed in the vicinity of the inner surface 13a of the bottom portion 13.

When the pump 28 is in operation, the liquid fuel stored in the tank 10 enters the conduit 26 through the inlet 27, and is pumped out of the tank 10 through the conduit 26. During this operation, in the tank 10, the position of the level 21 of the liquid fuel 20 lowers, the volume of the gas space 22 vertically above the level 21 increases, and the pressure in the gas space 22 decreases.

In the liquid storage system, when the pressure in the gas space 22 decreases, the nonflammable gas supplying apparatus 30 is activated to supply the gas space 22 with nonflammable gases. The nonflammable gas supplying apparatus 30 has a gas cylinder 32 as a nonflammable gas supply source and a conduit 34 for directing nonflammable gases from the gas cylinder 32 to the gas space 22 in the tank 10. The conduit 34 extends from the gas cylinder 32 through the top portion 12 of the tank 10. The conduit 34 has a supplying port 35 at one end in the tank 10 for supplying nonflammable gases. The supplying port 35 is disposed in the gas space 22 in the tank 10, specifically, in the vicinity of the inner surface 12a of the top portion 12.

When the pressure in the gas space 22 is below the pressure in the gas cylinder 32 and ambient atmospheric pressure, nonflammable gases in the gas cylinder 32 is directed into the tank 10 through the conduit 34 to supply the gas space 22 through the supplying port 35. The nonflammable gases supplied to the gas space 22 by a nonflammable gas supplying apparatus 30 include an inert gas that does not contain oxygen. The nonflammable gases are preferably "mass per unit molar number" is large (that is, high density) and gases which cause no problem if discharged into ambient atmosphere. Such nonflammable gases include a gas composed of elements having a molecular weight larger than that of oxygen, specifically, rare gases which are readily available. Such rare gases whose molecular weight is larger than that of oxygen, include Argon (Ar, average molecular weight about 40 [g/mol]) and xenon (Xe, average molecular weight about 131 [g/mol]). In this embodiment, argon (Ar) gas is used as a nonflammable gas.

The vent pipe 40 extends through the underground pit roof 7 and the top portion 12 of the tank 10. The vent pipe 40 has an opening 42 in the tank 10, through which gases flows in or out. The opening 42 is disposed in the gas space 22 in the tank 10, specifically, in the vicinity of the inner surface 12a of the top portion 12. In addition, the vent pipe 40 has an opening 48 outside of the tank 10, through which gases flows in or out. The opening 48 is disposed in a space outside of the tank 10, specifically, disposed vertically upwardly of the underground pit roof 7, where air at ambient atmospheric pressure exists.

Figure 3:
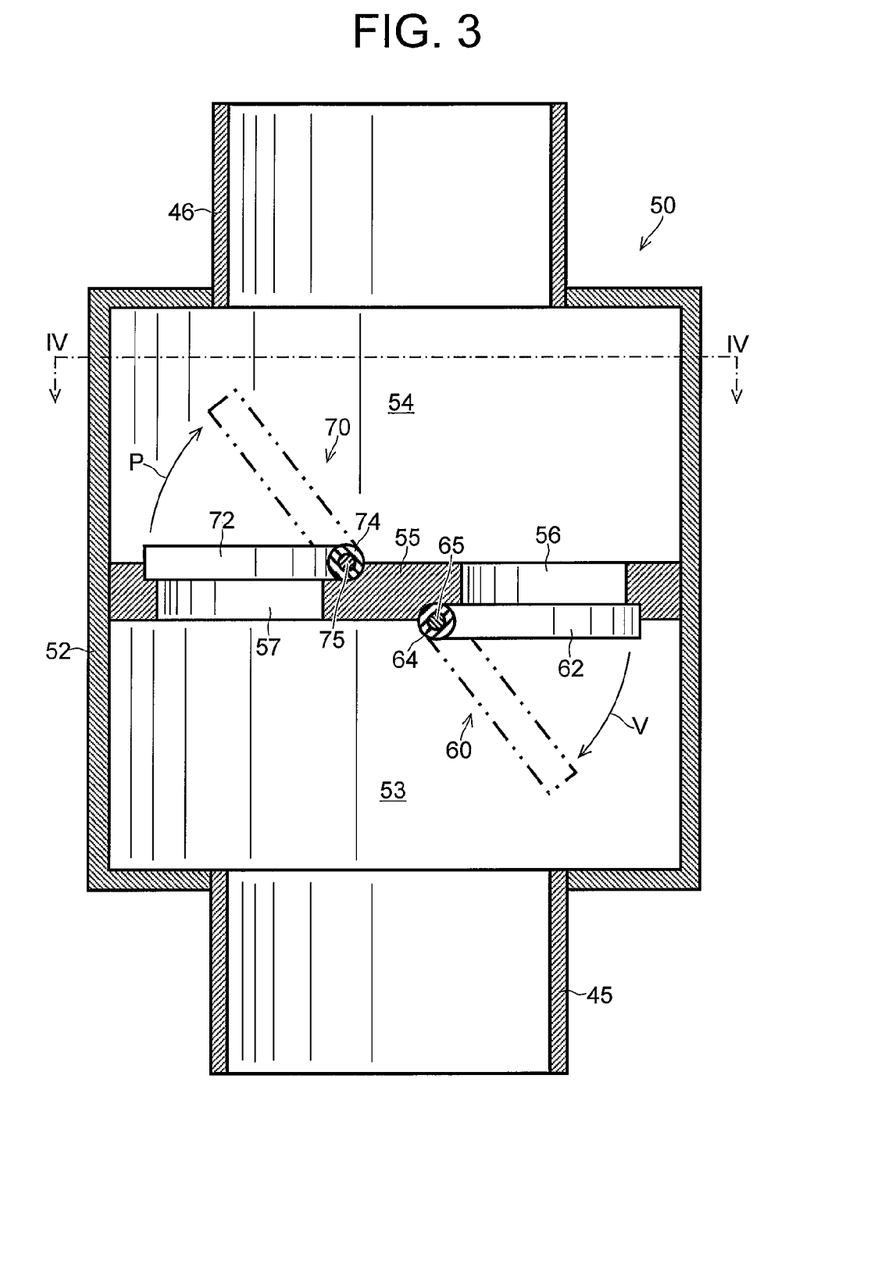
FIG. 3 is a longitudinal sectional view of a pressure control apparatus installed in the vent pipe of the liquid storage system according to the first embodiment.
Figure 4:
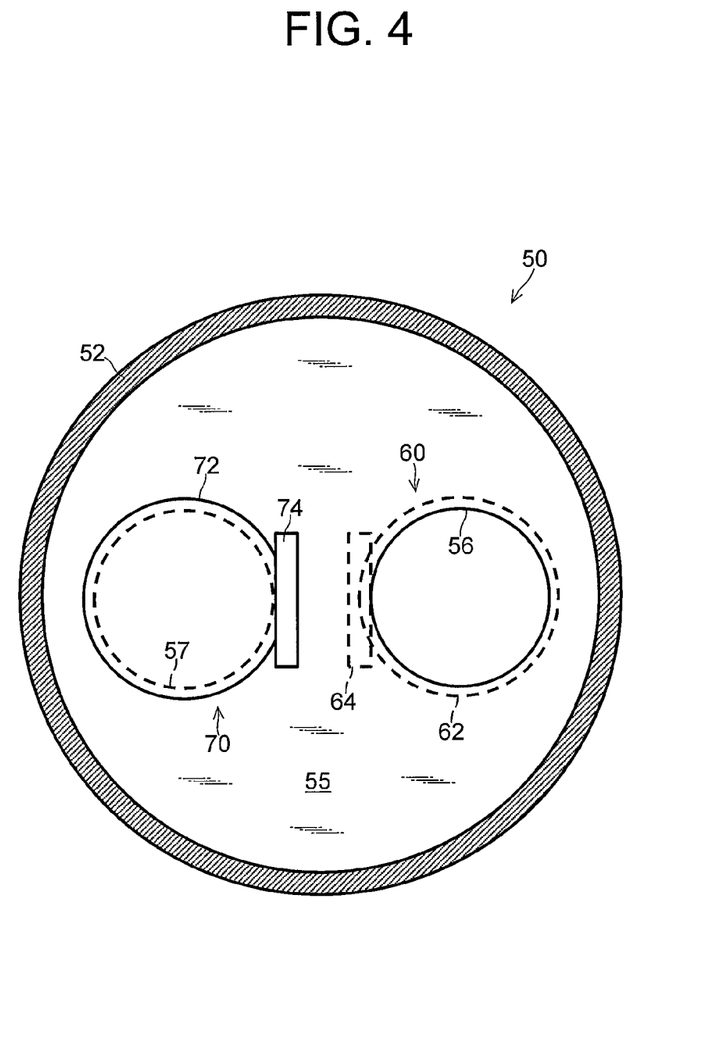
FIG. 4 is a cross-sectional view taken along the line IV-IV of FIG. 3.

The liquid storage system according to this embodiment, has an apparatus (referred to as a pressure control apparatus) 50 that operates responsive to the pressure difference between the gas space 22 and ambient atmospheric pressure, so as to limit the pressure of the gas space 22 to a predetermined range including ambient atmospheric pressure. The pressure control apparatus 50 is described below with reference to FIGS. 1 to 4. FIG. 3 is a longitudinal sectional view of the pressure control apparatus installed in the vent pipe of the liquid storage system of this embodiment. FIG. 4 is a cross-sectional view taken along the line IV-IV of FIG. 3. FIGS. 3 and 4 show the pressure control apparatus which includes two relief valves whose valving elements are each in closed position. In FIG. 3, these valving elements in respective open positions are indicated by phantom lines.

The pressure control apparatus 50 is installed in the midway of the vent pipe 40 and is configured to operate responsive to pressure difference between the gas space 22 and ambient atmospheric pressure. Specifically, the pressure control apparatus 50 introduces air outside of the tank 10 into the gas space 22 when the pressure in the gas space 22 falls by a predetermined value or more from ambient atmospheric pressure. Further, the pressure control apparatus 50 discharges air from the gas space 22 to outside of the tank 10 when the pressure in the gas space 22 rises by a predetermined value or more from ambient atmospheric pressure. the pressure control apparatus 50 limit the pressure in the gas space 22 to be within a predetermined range including ambient atmospheric pressure, that is, between a predetermined lower and upper limits.

As shown in FIG. 3, the pressure control apparatus 50 incorporates a vacuum relief valve 60 that is a check valve for allowing a flow of air from outside of the tank 10 to the gas space 22 and for stopping a flow of gas from the gas space 22 to outside of the tank 10. Further, the pressure control apparatus 50 incorporates a pressure relief valve 70 that is a check valve for allowing a flow of gas from the gas space 22 to outside of the tank 10 and for stopping a flow of air from outside of the tank 10 to the gas space 22. The vacuum relief valve 60 and the pressure relief valve 70 are arranged in parallel to each other. The vacuum relief valve 60 and the pressure relief valve 70, which prevent respective reverse flows, are each a so-called "flapper valve" or "flap valve" in which opening and closing of the respective valving elements 62 and 72 are controlled by the pressure of gas in the pressure control apparatus 50. The relief valves 60 and 70 each independently operate responsive to the pressure difference between the gas space 22 and ambient atmospheric pressure.

The relief valves 60 and 70 are each normally closed valve that the valving element is held closed when the pressure of the gas space 22 is within the predetermined range including ambient atmospheric pressure. In FIG. 3, the respective valving elements of the valves 60 and 70 in normal positions, namely, in closed positions, indicated by solid lines, respectively. The pressure control apparatus 50 including these relief valves 60 and 70 are configured to close off communication between the gas space 22 and ambient atmosphere outside of the tank 10. It is possible to prevent the air containing oxygen outside of the tank 10 from entering the gas space 22 in the tank 10.

The pressure control apparatus 50 has a common valve body (a so-called valve casing) 52 for accommodating the respective valving elements 62 and 72 of the vacuum relief valve 60 and the pressure relief valve 70. The valve body 52 connects the part 45 of the vent pipe 40 on the side of the gas space 22 from the pressure control device 50 and the part 46 on the atmosphere side from the pressure control apparatus 50. The valve body 52 has a substantially cylindrical shape, and has a columnar space therein.

The pressure control apparatus 50 has a partition member 55 that partitions the columnar space into a space (referred to as a tank-side space) 53 in communication with the gas space 22 and a space (referred to as an atmosphere-side space) 54 in communication with a space outside the tank 10. The partition member 55 has two through holes 56 and 57. Specifically, the partition member 55 has the inlet port 56 corresponding to the valving element 62 of the vacuum relief valve 60, through which the air from the atmosphere-side space 54 is introduced into the tank-side space 53 when the valving element 62 is in open position. In addition, the partition member 55 has the outlet port 57 corresponding to the valving element 72 of the pressure relief valve 70, through which the gas from the tank-side space 53 is discharged to the atmosphere-side space 54.

As shown in FIG. 4, the partition member 55 has a disk shape, and the two through holes 56 and 57, that is, the inlet port 56 and the outlet port 56, each having a substantially circular shape. The valving elements 62 and 72 each has a substantially disk shape. The valving element 62 of the vacuum relief valve 60 can close the inlet port 56. The valving element 72 of the pressure relief valve 70 can close the outlet port 56. The vacuum relief valve 60 and the pressure relief valve 70 are opposed each other in the radial direction of the partition member 55. The vacuum relief valve 60 includes the inlet port 56 and the valving element 62. The pressure relief valve 70 includes the outlet port 56 and the valving element 72. That is, in the pressure control apparatus 50, the vacuum relief valve 60 and the pressure relief valve 70 are connected in parallel to each other.

The vacuum relief valve 60 and the pressure relief valve 70 are each a so-called "flapper valve (also referred to as a flap valve)". The vacuum relief valve 60 has the valving element 62 operative to pivotally rotate about a pivot shaft 65 coupled to the partition member 55, and a member (referred to as a biasing member) 64 for biasing the valving element 62 into its closed position (shown in FIG. 3), in which the valving element 62 closes the inlet port 56 formed in the partition member 55. The pressure relief valve 70 has the valving element 72 operative to pivotally rotate about a pivot shaft 75 coupled to the partition member 55, and a biasing member 74 for biasing the valving element 72 into its closed position (shown in FIG. 3), in which the valving element 72 closes the outlet port 57 formed in the partition member 55. The biasing members 64 and 74 can each be achieved by the use of various springs such as a helical torsion spring. For example, by changing spring constants, the opening and closing pressures of the vacuum relief valve 60 and the pressure relief valve 70 can be adjusted respectively.

The valving element 62 of the vacuum relief valve 60 and the valving element 72 of the pressure relief valve 70 each have a substantially disk shape. The difference between the pressure of the tank-side space 53 (namely, the pressure of the gas space 22, shown in FIG. 1) and the pressure of the atmosphere-side space 54 (namely, ambient atmospheric pressure) exerts on these valving elements 62 and 72. The vacuum relief valve 60 and the pressure relief valve 70 are configured so that the corresponding valving elements 62 and 72 independently pivotally rotate with respect to the partition member 55 according to the pressure difference between the tank-side space 53 and the atmosphere-side space 54.

In the vacuum relief valve 60, the valving element 62 moves to the open position as indicated by arrow V in FIG. 3 against the biasing force of the biasing member 64 when the pressure in the gas space 22 is lower than or equal to a predetermined lower limit by gauge pressure, that is, the pressure in the gas phase space 22 falls by a predetermined value from ambient atmospheric pressure. This provides communication between the tank-side space 53 and the atmosphere-side space 54 through the inlet port 56. The gas space 22 whose pressure has decreased is brought into communication with outside of the tank 10 through the vent pipe 40. This allows air from outside of the tank 10 to be introduced into the gas space 22. The pressure at which the vacuum relief valve 60 starts to open, namely, the lower limit of the pressure of the gas space 22 is set to, for example, minus 0.01 MPa by gauge pressure.

In the pressure relief valve 70, the valving element 72 moves to the open position as indicated by arrow P in FIG. 3 against the biasing force of the biasing member 74, when the pressure in the gas space 22 is higher than or equal to a predetermined upper limit by gauge pressure, that is, the pressure in the gas phase space 22 rises by a predetermined value from ambient atmospheric pressure. This provides communication between the tank-side space 53 and the atmosphere-side space 54 through the outlet port 57. The gas space 22 whose pressure has increased is brought into communication with outside of the tank 10 through the vent pipe 40. This allows gases in the gas space 22 to be discharged out of the tank 10. The pressure at which the pressure relief valve 70 starts to open, namely, the upper limit of the pressure of the gas space 22 is set to, for example, plus 0.01 MPa by gauge pressure.

The pressure control apparatus 50 configured as described above, allows air outside of the tank 10 to be introduced into the gas space 22 through the vent pipe 40, when the pressure in the gas space 22 drops below the predetermined lower limit by gauge pressure. According to this embodiment, it is possible to prevent the pressure in the gas space 22 from becoming excessively lower than ambient atmospheric pressure, by introducing air outside of the tank 10 into the gas space 22, in the case where the liquid pumping apparatus 25 (shown in FIG. 1) pumps the liquid fuel 20 stored in the tank 10 to outside of the tank 10 at a relatively high flow rate, the position of the level 21 in the tank 10 rapidly lowers, and the pressure of the gas space 22 falls even when the nonflammable gas supplying apparatus 30 supplies nonflammable gases to the gas space 22.

Further, the pressure control apparatus 50 allows air in the gas space 22 to be discharged out of the tank 10 through the vent pipe 40, when the pressure in the gas space 22 rises above the predetermined upper limit by gauge pressure. According to this embodiment, it is possible to prevent the pressure in the gas space 22 from becoming excessively high, by discharging gases filled in the gas space 22 to outside of the tank 10, in the case where the pressure in the gas space 22 rises above the upper limit, when the liquid fuel 20 stored in the tank 10 is vaporized (volatilized), or when nonflammable gas is excessively supplied to the tank 10.

Preferably, the nonflammable gas supplying apparatus 30 may supplies nonflammable gases to the gas space 22 when the air from outside of the tank 10 is introduced into the gas space 22 by the above-described pressure control apparatus 50, namely, the valving element 62 of the vacuum relief valve 60 is open. This is readily achieved by the use of a control valve (not shown) installed in the conduit 34, controlled to open when the valving element 62 of the vacuum relief valve 60 is in open position.

When the air containing oxygen is introduced into the gas space 22 by opening the vacuum relief valve 60 in the above-described pressure control apparatus 50, the oxygen concentration in the gas filled in the gas space 22 rises. Oxygen in the gas space 22 may dissolve in dewed water in the tank and cause metal corrosion on the inner surfaces 12a, 13a, 16a and 17a of the metal tank 10. Further, if the oxygen concentration in the gas space 22 becomes higher than the so-called "combustion limit oxygen concentration", there is a possibility that the liquid fuel 20 or gases in the gas space 22 ignites.

Figure 5:
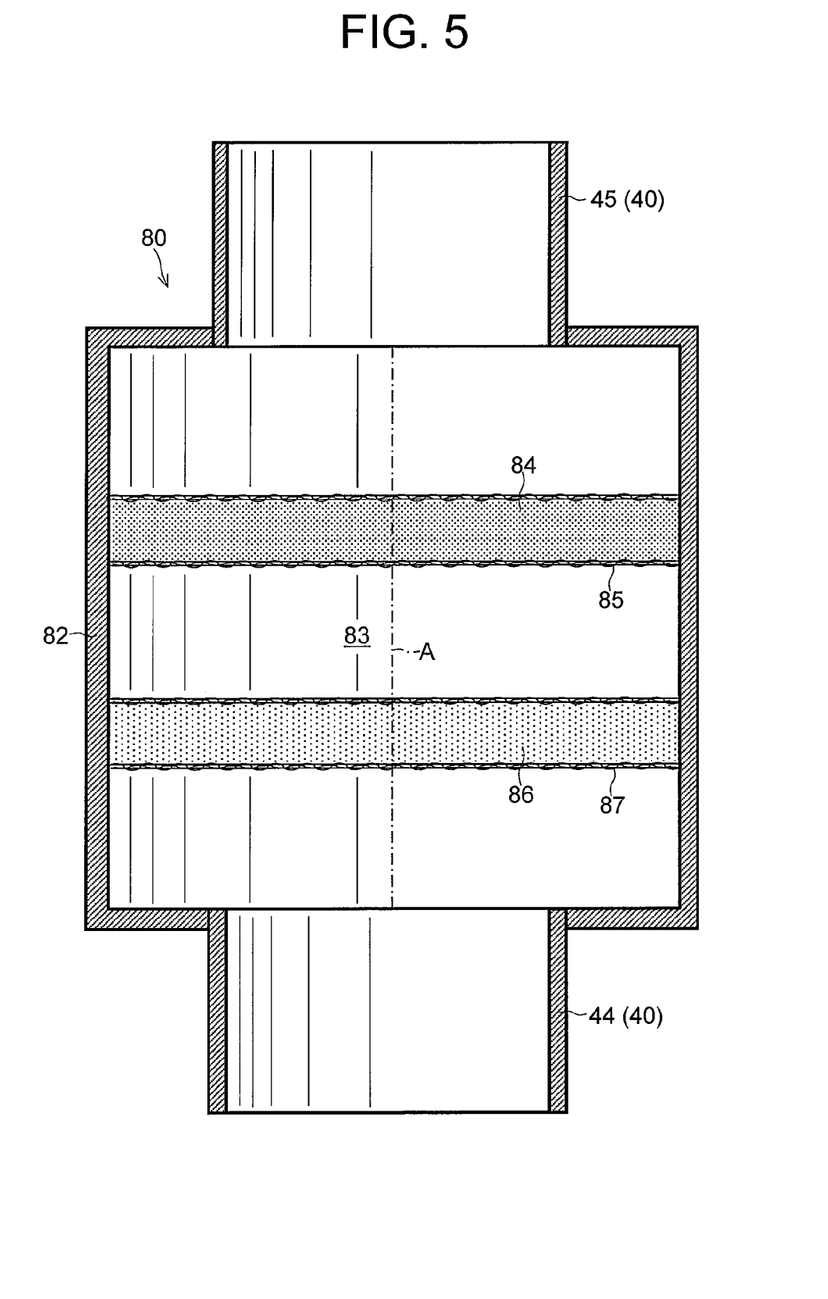
FIG. 5 is a longitudinal sectional view of a filter installed in the vent pipe of the liquid storage system according to the first embodiment.

In order to make the oxygen concentration in the gas space 22 as close to zero as possible, the liquid storage system has a filter 80 disposed on the gas-space side of the pressure control apparatus 50 in the vent pipe 40, to separate and retain oxygen from gases. The filter 80 will be described below with reference to FIGS. 1 and 5. FIG. 5 is a longitudinal sectional view of the filter installed in the vent pipe of the liquid storage system according to the first embodiment. FIG. 5 shows arrangements of an oxygen absorber and a moisture absorber in the filter.

As shown in FIG. 1, the filter 80 is disposed on the gas-space side of the pressure control apparatus 50 in the vent pipe 40. Specifically, the filter 80 is disposed between the part 45 of the vent pipe 40 on the side of the gas space 22 from the pressure control apparatus 50 and a part 44 of the vent pipe 40 extending through the top portion 12 of the tank 10. The spaces in these parts 44 and 45 of the vent pipe 40 is constantly in communication with the gas space 22, and filled with the same gas at the same pressure as in the gas space 22. The part 44 is an end part 44 including an opening 42 disposed in the gas space 22.

As shown in FIG. 5, The filter 80 has a housing 82 disposed between two sections 44 and 45 of the vent pipe 40, the inner space 83 in the housing 82 being in communication with the gas space 22 (see FIG. 1). The housing 82 accommodates an oxygen absorber 84 for adsorbing oxygen contained in the gas in the inner space 83 and a moisture absorber 86 for adsorbing moisture contained in the gas in the inner space 83. Zeolite, particularly, 3A type zeolite which adsorbs and desorbs water and does not adsorb carbon dioxide or nitrogen can be used as the moisture absorber 86.

The housing 82 of the filter 80 has a substantially cylindrical shape and is disposed coaxially with the sections 44 and 45 of the vent pipe 40. That is, the housing 82 forms a part of the vent pipe 40. The inner space 83 has a column shape. The oxygen absorber 84 and the moisture absorber 86 have disc shapes extending in the direction substantially perpendicular to the axis of the inner space 83 of the housing 82 (indicated by a dashed line A in FIG. 5). The oxygen absorber 84 and the moisture absorber 86 are spaced apart from each other along the axis, namely, along the direction of the gas flowing.

The filter 80 has a retaining member 85 for retaining the oxygen absorber 84 and a retaining member 87 for retaining the moisture absorber in the housing 82. The retaining members 85 and 87 are each a pair of mesh-shaped members and its outer edge is coupled to the housing 82. The retaining members 85 and 87 are configured to allow gas to pass through, and sandwich the oxygen absorber 84 and the moisture absorber 86, respectively. The filter 80 separates and retains at least oxygen and moisture from the gas in the inner space 83.

The inner space 83 in the housing 82 is in communication with the gas space 22 in the tank 10. The filter 80 deoxidizes the gas in the gas space 22 by the oxygen absorber 84. In addition, the filter 80 can dehumidify the gas in the gas space 22 by the moisture absorber 86. The oxygen absorber 84 which has adsorbed oxygen and the deoxidizing ability is lowered, the moisture absorber 86 which has adsorbed moisture and the dewatering ability is lowered are each exchanged for a new one. The housing 82 has an access hole (not shown) for exchanging the oxygen absorber 84 and the moisture absorber 86. Also, the oxygen absorber 84 and the moisture absorber 86 whose capabilities have been decreased may be exchanged for another filter 80 together with the housing 82 and the retaining members 85 and 87 which accommodate new ones.

Further, the liquid storage system has a concentration sensor 90 capable of measuring the concentration of at least one of oxygen and nonflammable gas in the gas space 22. The liquid storage system has an oxygen concentration sensor 90 for measuring the oxygen concentration in a space communicating with the gas space 22 in the vent pipe 40. The oxygen concentration sensor 90 is disposed at the end part 44 on the gas-space side of the vent pipe 40, the space within the end part 44 being constantly in communication with the gas space 22. As the oxygen concentration sensor 90, for example, an oxide ion conductive ceramic sensor such as stabilized zirconia or the like can be used.

The oxygen concentration in the gas space 22 can be measured by such an oxygen concentration sensor 90. It is possible to ascertain the state of supply of nonflammable gases to the gas space 22 by the nonflammable gas supplying apparatus 30. In the case where nonflammable gases supplied to the gas space 22 by the nonflammable gas supplying apparatus 30 is a rare gas such as argon, the sensor for measuring the concentration of nonflammable gas in the gas space 22, typically, a rare gas concentration sensor for measuring the concentration of a rare gas (argon) may be used instead of the oxygen concentration sensor 90. Besides, the rare gas concentration sensor and the oxygen concentration sensor 90 may be used in combination to measure both oxygen and nonflammable gas (rare gas) concentration in the gas space 22.

A method of replacing the air in the tank 10 with a nonflammable gas will be described with reference to FIG. 1. In the following example, air containing oxygen enters the gas space 22 in the tank 10 when the tank 10 has been supplied with liquid fuel 20 from a tank truck or the like.

First, a conduit 34 to be in communication with the gas space 22, is installed in the tank 10. The conduit 34 is connected to a gas cylinder 32 outside of the tank10 as a nonflammable gas supply source. The gas cylinder 32 is filled with a rare gas as a nonflammable gas, specifically, argon. Note that the conduit 34 or the gas cylinder 32 may be provided with a control valve (not shown) for controlling the supply of the rare gas from the gas cylinder 32 to the gas space 22.

Then, rare gas is supplied from the gas cylinder 32 through the conduit 34 to the gas space 22. The pressure of the gas space 22 is increased to open the pressure relief valve 70 of the pressure control apparatus 50. The air in the gas space 22 is discharged (purged) out of the tank 10 through the vent pipe 40, and the interior of the gas space 22 and the vent pipe 40 is filled with the rare gas. That is, the rare gas replaces gases in the gas space 22, mainly air containing oxygen.

In this case, the rare gas supplied to the gas space 22 is partly discharged from the tank 10 through the vent pipe 40. Rare gas, specifically argon, is not harmful to the human and the environment, so even if it is discharged from the tank 10, there is no particular problem as long as it is small amount.

Then, it is determined whether the gas space 22 is filled with the rare gas. Specifically, it is determined based on the oxygen concentration measured by the oxygen concentration sensor 90. The oxygen concentration sensor 90 is disposed on the gas-space side of the pressure control apparatus 50 in the vent pipe 40. The oxygen concentration sensor 90 measures the oxygen concentration in the end part 44 of the vent pipe 40 in communication with the gas space 22. If the oxygen concentration is substantially zero, it is determined that the gas space 22 is filled with the rare gas.

By supplying a nonflammable gas to the gas space 22 as described above, it is possible to make the oxygen concentration in the gas space 22 substantially zero. In this example, until the oxygen concentration measured by the oxygen concentration sensor 90 becomes substantially zero, the nonflammable gas supplying apparatus 30 continuously supply a rare gas (argon) as a nonflammable gas at a predetermined flow rate to the gas space 22. Note that, for example, it is also preferable to feedback-control the flow rate and supply time of the rare gas to the gas space 22 by the nonflammable gas supplying apparatus 30, based on the oxygen concentration measured by the oxygen concentration sensor 90.

Thereafter, as the liquid fuel 20 in the tank 10 is delivered to outside of the tank 10 by the liquid pumping apparatus 25, the position of the level 21 lowers, and the volume of the gas space 22 increases. The nonflammable gas supplying apparatus 30 supplies a rare gas to the gas space 22 according to an increase in the volume of the gas space 22 so that the air outside of the tank 10 is not introduced into the gas space 22 through the vent pipe 40. Specifically, the nonflammable gas supplying apparatus 30 supplies a rare gas to the gas space 22 so that the vacuum relief valve 60 of the pressure control apparatus 50 does not open.

The supply of the rare gas to the gas space 22 is achieved by controlling the nonflammable gas supplying apparatus 30 while monitoring the oxygen concentration in the gas space 22 measured by the oxygen concentration sensor 90. Further, it can also be achieved by that the nonflammable gas supplying apparatus 30 is controlled in cooperation with the pump 28 of the liquid pumping apparatus 25.

When the liquid fuel 20 is supplied to the tank 10 from a tank truck or the like, the position of the level 21 rises; the volume of the gas space 22 decreases to increase the pressure of the gas space 22. In this case, the pressure relief valve 70 opens to discharge the rare gas from the gas space 22 to outside of the tank 10 through the pressure control apparatus 50 in the vent pipe 40.

Further, at the time of periodic inspection of the tank 10, the gas cylinder 32 of the nonflammable gas supplying apparatus 30 is replaced with a cylinder filled with air, the air is supplied to the gas space 22 through the conduit 34, thereby increasing the pressure in the space 22. Then, the pressure relief valve 70 is open to discharge the rare gas from the gas space 22 to outside of the tank 10 through the vent pipe 40, and the gas space 22 is filled with air. That is, the gas in the gas space 22 is replaced with air from a rare gas. It is possible to open the maintenance hole (so-called manhole, not shown) provided in the tank 10 and to inspect the interior of the tank 10 by an operator.

As described above, the liquid storage system according to this embodiment, as shown in FIG. 1, has the tank 10 for storing the liquid fuel 20 therein, the vent pipe 40 for providing communication between outside of the tank 10 and the gas space vertically above a level of liquid fuel in the tank 10, the nonflammable gas supplying apparatus 30 for supplying the gas space 22 with the nonflammable gas, and the pressure control apparatus 50 installed in the vent pipe to operate responsively to a pressure difference between the gas space and ambient atmospheric pressure so as to limit the pressure in the gas space to a predetermined range including ambient atmospheric pressure. The pressure control apparatus 50 introduces ambient air outside the tank into the gas space 22 through the vent pipe 40 when the pressure in the gas space is lower than or equal to a predetermined lower limit by gauge pressure. And the pressure control apparatus 50 discharge a gas from the gas space 22 out of the tank 10 through the vent pipe 40 when the pressure in the gas space 22 is higher than or equal to a predetermined upper limit by gauge pressure. Note that the lower limit is set to minus 0.01 MPa, and the upper limit is set to plus 0.01 MPa, by gauge pressure, based on ambient atmospheric pressure.

According to this embodiment, it is possible to maintain the pressure of the gas space 22 in the tank 10 within a desired range including ambient atmospheric pressure, namely, between the lower limit and the upper limit. When the position of the level 21 of the liquid fuel 20 stored in the tank 10 decreases, and the volume of the gas space 22 increases, the gas space 22 is supplied with the nonflammable gas which does not contain oxygen, by the nonflammable gas supplying apparatus 30. This allows the oxygen concentration in the gas space 22 to be brought close to zero as much as possible. It is possible to maintain a condition where the liquid fuel 20 is not in contact with oxygen by filling the gas space 22 with a rare gas which is a nonflammable gas containing no oxygen. The possibility of igniting the liquid fuel 20 in the tank 10 can be made extremely low. Further, the metal corrosion in the tank 10 can be prevented.

In the liquid storage system according to this embodiment, the pressure control apparatus 50 incorporates a vacuum relief valve 60 that is a check valve for allowing a flow of air from outside the tank 10 to the gas space 22 and for stopping a flow of gas from the gas space 22 to outside the tank in the vent pipe 40. Further, the pressure control apparatus 50 incorporates a pressure relief valve 70 that is a check valve for allowing a flow of gas from the gas space 22 to outside the tank 10 and for stopping a flow of air from the outside the tank 10 to the gas space 22 in the vent pipe 40. The vacuum relief valve 60 and the pressure relief valve 70 are normally closed valves which are closed when the pressure of the gas space 22 is within the predetermined range. The vacuum relief valve 60 is open to introduce air outside the tank into the gas space 22 when the pressure in the gas space 22 is lower than or equal to the lower limit. The pressure relief valve 70 is open to discharge gas from the gas space 22 to outside of the tank 10 when the pressure in the gas space is higher than or equal to the upper limit.

According to this embodiment, the above-described pressure control apparatus 50 can be achieved by two check valves (normally closed valves) specifically, by the vacuum relief valve 60 and the pressure relief valve 70 arranged in parallel to each other with different flow directions.

Note that, the nonflammable gas supplying apparatus 30 has a gas cylinder 32 as a nonflammable gas supply source, and a conduit 34 for directing a nonflammable gas from the gas cylinder 32 to the gas space 22 in the tank 10. The nonflammable gas supplying apparatus 30 appropriately supplies the nonflammable gas (rare gas) to the gas space 22 responsive to the lowering of the level 21 of the liquid fuel 20 stored in the tank 10 and the increasing of the volume of the gas space 22. However, the method of supplying a nonflammable gas to the gas space 22 is not limited to this embodiment. The nonflammable gas supplying apparatus 30 may be controlled according to the oxygen concentration in the gas space 22 measured by the oxygen concentration sensor 90, so that the oxygen concentration in the gas space 22 is close to zero.

Further, the oxygen concentration sensor 90 for measuring the oxygen concentration in the gas space 22 is provided at the end part 44 of the vent pipe 40, the end part 44 being closer to the gas space 22 than the pressure control apparatus 50. However, the method of estimating the oxygen concentration in the gas space 22 is not limited to this. In the case where a rare gas such as argon is used as a nonflammable gas, a sensor capable of measuring the concentration of the rare gas may be used.

The gas in the gas space 22 is any one or combination of gases vaporized (volatilized) the liquid fuel 20, air introduced from outside of the tank 10, and nonflammable gases (rare gas) supplied by the nonflammable gas supplying apparatus 30. By measuring the concentration of the rare gas in the gas space 22, it is also possible to estimate the concentration of oxygen in the gas space 22 from the measurement result. Note that both the oxygen concentration sensor 90 for measuring the oxygen concentration and a sensor (not shown) for measuring the concentration of the rare gas such as argon may be provided at a section of the vent pipe 40 which is constantly in communication with the gas space 22, for example, the end part 44. It is preferable to monitor the at least one of the rare gas concentration and the oxygen concentration, and to intermittently or continuously supply a nonflammable gas.

The liquid storage system has the filter 80 disposed on the gas-space side of the pressure control apparatus 50 in the vent pipe 40, to separates and retains at least oxygen from the gas flowing into the vent pipe 40 from the gas space 22. In the case when the vacuum relief valve 70 is open to introduce air into the gas space 22, it is possible to make the oxygen concentration in the gas space 22 lower, without discharging (purging) air out of the tank 10 by opening of the vacuum relief valve 70.

The filter 80 has the oxygen absorber 84 that adsorbs oxygen contained in the gas in the space 83 in communication with the gas space 22 of the vent pipe 40, and the moisture absorber 86 that adsorbs moisture contained in the gas in the space 83. It is possible to deoxygenate and dehumidify the gas in the gas space 22 with simple configurations. It is preferable that the oxygen absorber 84 and the moisture absorber 86 each having the reduced adsorption ability, be replaced with a new one after filling the interior of the gas space 22 and the vent pipe 40 with the rare gas. Note that the filter 80 may be replaced with a new one. It is also preferable to provide the vent pipe 40 with a conduit (not shown) bypassing the filter 80 and a valve (for example, a globe valve) for stopping the flow of gas through the filter 80.

Second Embodiment

Figure 6:
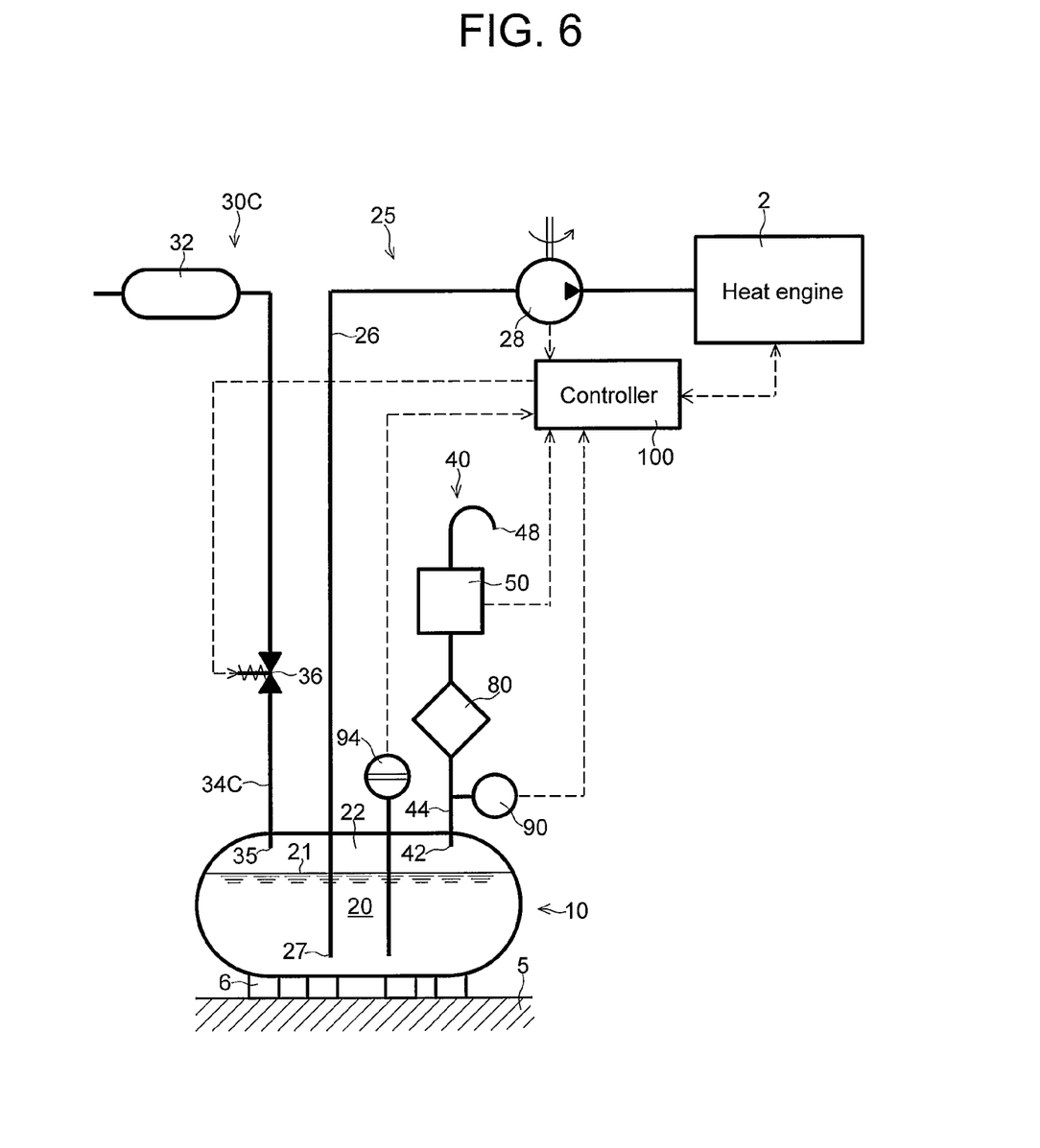
FIG. 6 is a schematic diagram of the liquid storage system according to a second embodiment, and shows a longitudinal section of the liquid tank.

A liquid storage system according to this embodiment, and a method of supplying a nonflammable gas to a gas space in a tank in the liquid storage system, are described with reference to FIG. 6. FIG. 6 is a schematic diagram of the liquid storage system according to this embodiment, and shows a longitudinal section of the liquid tank. Note that the identical reference numerals are given to the configurations substantially identical to that of the of the first embodiment, and the description thereof is omitted.

In this embodiment, the liquid pumping apparatus 25 supplies the liquid fuel 20 stored in the tank 10 to a heat engine 2. The heat engine 2 is a prime mover that converts the thermal energy produced by the combustion of the liquid fuel 20 into mechanical energy. The heat engine 2 includes, for example, an internal combustion engine, an external combustion engine, a gas turbine, and a steam turbine. The heat engine 2 is a diesel engine for emergency, and the liquid fuel 20 stored in the tank 10 is diesel fuel. The pump 28 of the liquid pumping apparatus 25 can be driven by electric power or a part of mechanical power produced by the heat engine 2.

A control valve 36 for controlling the flow of nonflammable gas to the gas space 22, is provided with a conduit 34C that directs a nonflammable gas (rare gas) from the gas cylinder 32 to the gas space 22 in the tank 10. The control valve 36 is configured as a valve that its valving element is operated by the electromagnetic force of the electromagnet, namely, a so-called "solenoid valve".

The control valve 36 of the nonflammable gas supplying apparatus 30C is controlled according to the concentration of at least one of oxygen and nonflammable gas measured by the concentration sensor 90. Specifically, the control valve 36 is controlled according to the oxygen concentration measured by the oxygen concentration sensor 90. For example, when the oxygen concentration in the gas space 22 is equal to or higher than a predetermined threshold or range, the control so that the control valve 36 is open and so that the nonflammable gas (rare gas) from the gas cylinder 32 as a nonflammable gas supply source is supplied to the gas space 22 through the conduit 34C.

The tank 10 is provided with a device (referred to as a "level measuring instrument") 94 that measures the position of the level 21 of the liquid fuel 20. The level measuring instrument 94 is also referred to as "automatic level measuring instrument for measuring the level of liquid" or "liquid level gauge". The level measuring instrument 94 includes a switch that generates a signal according to the position of the liquid level 21. The switch can generate signals depending on whether the position of the liquid level 21 be within a predetermined normal range or lower than the range. The control valve 36 of the nonflammable gas supplying apparatus 30 is controlled according to the position of the liquid level measured by the level measuring instrument 94.

The liquid storage system has a controller 100 that can control opening and closing of the control valve 36 of the nonflammable gas supplying apparatus 30. The controller 100 may be, for example, an electronic control unit (ECU) that controls the heat engine 2 and the pump 28 of the liquid pumping apparatus 25. The controller 100 also may be an electronic control unit dedicated to the liquid storage system.

The controller 100 can acquire the operating conditions of the heat engine 2, for example, information indicating the torque and the rotational speed of the output shaft (not shown) of the heat engine 2. The controller 100 can acquire information indicating the operating conditions of the pump 28 of the liquid pumping apparatus 25, for example, information indicating the operation/non-operation, and the flow rate of the liquid fuel supplied to the heat engine 2.

The controller 100 determines whether it is "normal times" when the heat engine 2, namely, the diesel engine for emergency is not in operation, or "when the engine is in operation" in which the diesel engine for emergency is in operation. The controller 100 can determine whether the liquid fuel 20 stored in the tank 10 is pumped by the pump 28 to the heat engine 2 by the liquid pumping apparatus 25, and the liquid level 21 lowers (namely, the volume of the gas space 22 increases), or not.

In the "normal times" in which the diesel engine 2 is not in operation, the controller 100 controls the opening and closing of the control valve 36 according to the oxygen concentration measured by the oxygen concentration sensor 90. Specifically, the controller 100 controls the control valve 36 to be closed when it is determined that the oxygen concentration is within a predetermined normal range. When it is determined that the oxygen concentration is higher than the normal range, the control valve 36 is controlled to be open so that the rare gas from the gas cylinder 32 is supplied to the gas space 22.

As described above, in "normal times", when the oxygen concentration in the gas space 22 is relatively high, the rare gas is supplied to the gas space 22 to lower the oxygen concentration. By appropriately supplying the rare gas to the gas space 22 according to the oxygen concentration, the oxygen concentration in the gas space 22 can be kept within the normal range as much as possible.

The controller 100 can acquire information indicating opening and closing of each of the vacuum relief valve 60 and the pressure relief valve 70 (see FIG. 5) from the pressure control apparatus 50. Specifically, the controller 100 acquires a signal indicating opening of the vacuum relief valve 60 from a switch (not shown) provided in the vacuum relief valve 60.

The controller 100 can acquire information indicating the oxygen concentration in the end part 44 of the vent pipe 40, namely, the oxygen concentration in the gas space 22 from the oxygen concentration sensor 90. Specifically, the controller 100 acquires a signal indicating whether the oxygen concentration in the gas space 22 is within a predetermined normal range or higher than the range from a switch (not shown) provided in the oxygen concentration sensor 90.

The controller 100 can acquire information indicating the position of the level 21 of the liquid fuel 20 in the tank 10. Specifically, the controller 100 acquires information indicating whether the position of the level 21 is within a predetermined normal range or the position lower than the normal range, by a switch (not shown) provided in the level measuring instrument 94.

The controller 100 determines for each of the following conditions based on the above-described various information and signal.

(A) Whether the heat engine (the diesel engine for emergency) 2 is in operation,
(B) Whether the pump 28 of the liquid pumping apparatus 25 is in operation,
(C) Whether the oxygen concentration in the gas space 22 in the tank 10 is higher than the predetermined normal range,
(D) Whether the position of the level 21 in the tank 10 is lower than the predetermined normal range,
(E) Whether the vacuum relief valve 60 of the pressure control apparatus 50 is open, When at least one of the conditions (A) to (E) described above is satisfied, the controller 100 controls the control valve 36 to be open so that the nonflammable gas supplying apparatus 30C supplies the gas space 22 with the rare gas. When none of the conditions (A) to (E) is satisfied, the controller 100 controls the control valve 36 to be closed.

In the case (A) where the heat engine (the diesel engine for emergency) 2 is in operation, or (B) where the pump 28 of the liquid pumping apparatus 25 is in operation, that is, in the case where the liquid level 21 of the liquid fuel 20 stored in the tank 10 lowers, the volume of the gas space 22 increases, and the pressure of the gas space 22 lowers. In this case, if the vacuum relief valve 60 opens, there is a possibility that air containing oxygen is introduced into the gas space 22. In order to suppress the introduction of air into the gas space 22, the controller 100 controls so that the control valve 36 is open so as to supply the rare gas to the gas space 22. It is possible to suppress the opening of the vacuum relief valve 60 by maintaining the pressure in the gas space 22, and to prevent the oxygen concentration in the gas space 22 from increasing.

In the case (C) where the oxygen concentration in the gas space 22 is higher than the predetermined normal range, the controller 100 controls the control valve 36 to be open and so that the gas space 22 is supplied with the rare gas. Whereby the oxygen concentration in the gas space 22 is lowered, and the oxygen concentration can be kept within the normal range as much as possible. Note that, when the pressure in the gas space 22 becomes equal to or higher than the predetermined upper limit by the supply of the rare gas to the gas space 22, the pressure relief valve 70 of the pressure control apparatus 50 opens so that a certain oxygen-containing gas in the gas space 22 is discharged out of the tank 10.

In the case (D) where the position of the liquid level 21 in the tank 10 is lower than the predetermined normal range, the controller 100 controls so that the control valve 36 is open to supply the rare gas to the gas space 22. It is possible to maintain the pressure in the gas space 22 within a predetermined normal range and to prevent introduction of air into the gas space 22 by opening the vacuum relief valve 60.

In the case (E) where the vacuum relief valve 60 is open, that is, when the air outside of the tank 10 is introduced into the gas space 22 in the tank 10 through the vent pipe 40 by the pressure control apparatus 50, the controller 100 so that the control valve 36 is open to supply the rare gas to the gas space 22. The vacuum relief valve 60 is open when the pressure in the gas space 22 is lower than the predetermined lower limit. In this case, By supplying the noble gas to the gas phase space 22 by the nonflammable gas supply device 30 C, the pressure of the gas space 22 can be maintained within the normal range including ambient atmospheric pressure, and the introduction of air containing oxygen into the gas phase space 22 can be suppressed.

As described above, the "method of supplying nonflammable gases to the gas space in the tank in the liquid storage system" according to this embodiment, the noncombustible gas supplying apparatus supply the gas space with nonflammable gases in any one or combination of the cases (A) and (B) that the liquid level of a liquid stored in the tank decreases, (C) that the oxygen concentration in the gas space is higher than a predetermined normal range, (D) that the position of a level in the tank is lower than a predetermined normal range, and (E) that air outside the tank is introduced into the gas space through the vent pipe by the pressure control apparatus.

This prevents the pressure control apparatus 50 from introducing air containing oxygen outside of the tank 10 into the gas space 22 in the tank 10 through the vent pipe 40 due to the pressure fall in the gas space 22. By supplying nonflammable gases to the gas space 22 in this manner, it is possible to keep the oxygen concentration in the gas space 22 close to zero while maintaining the pressure of the gas space 22 in the tank 10 within a desired range. It is possible to prevent metal corrosion and catching fire in the tank while readily pumping of the liquid in the tank to outside the tank.

Other Embodiments

While embodiments of the present invention have been described, these embodiments have been presented by way of example only, and are not intended to limit the scope of the invention. In the embodiments described above, the liquid stored in the tank 10 is the liquid fuel 20 having flammability such as diesel fuel, but the liquid fuel stored in the tank is not limited to this. The liquid can be various liquid fuels. In the case where the tank 10 may be a so-called water tank in which water is stored, it is unnecessary to dehumidify the gas space 22, and there is no need to provide the moisture absorber 86 in the filter 80.

In the above-described embodiments, Argon, which is a rare gas having a molecular weight larger than that of oxygen, is employed as a nonflammable gas supplied to the gas space 22 by the nonflammable gas supplying apparatus 30. However, nonflammable gas according to the present invention is not limited to this. nonflammable gas may be any one as long as it does not contain oxygen and does not react with the gas vaporized in the tank 10. Nonflammable gases according to the present invention may include rare gases such as xenon (Xe), radon (Rn), gases such as carbon dioxide ($CO_2$) and nitrogen ($N_2$), or mixtures of these gases. It should be noted that such a mixed gas containing no oxygen is preferably configured to have a higher density than oxygen.

In the above-described embodiments, a nonflammable gas supplying apparatus 30 and 30 C supply nonflammable gases filled in the gas cylinder 32 to the gas space 22 through the conduits 34 and 34 C, but the nonflammable gas supplying apparatus according to the present invention is not limited to this. In the nonflammable gas supplying apparatus, For example, a compressor, a pump or the like, may be employed, instead of the gas cylinder 32, to compress a nonflammable gas from a nonflammable gas supply source and to pumps the nonflammable gas to the gas space 22.

In the above-described embodiments, the pressure control apparatus 50 incorporates 50 the vacuum relief valve 60 that is a check valve for allowing a flow of air from outside the tank 10 to the gas space and for stopping a flow of gas from the gas space 22 to outside of the tank 10 in the vent pipe 40, and a pressure relief valve 70 that is a check valve for allowing a flow of gas from the gas space 22 to outside of the tank 10 and for stopping a flow of air from outside the tank 10 to the gas space 22 in the vent pipe 40. The relief valves 60 and 70 are normally closed valves which are closed when the pressure of the gas space 22 is within the predetermined range. The vacuum relief valve 60 is open to introduce air outside of the tank 10 into the gas space 22 when the pressure in the gas space is lower than or equal to the lower limit. The pressure relief valve 70 is open to discharge gas from the gas space 22 to outside of the tank 10 when the pressure in the gas space 22 is higher than or equal to the upper limit. However, the pressure control apparatus according to the present invention is limited to this. The pressure control apparatus includes, for example, at least one relief valve or control valve may be employed to controls the pressure of the gas space 22 within a predetermined range including ambient atmospheric pressure, that is, between a predetermined lower and upper limits.

The embodiments described above may be combined in any possible ways. Further, the embodiments described above may be reduced to practice in various configurations. Various omissions, replacements and changes can be made, without departing from the scope and gist of the invention. The accompanying claims and their equivalents are intended to cover such forms or modifications as would fall within the scope and spirit of this invention.

What is claimed is:

1. A liquid storage system comprising:
   a tank for storing liquid fuel therein,
   a vent pipe for providing communication between outside of the tank and a gas space vertically above a level of the liquid fuel in the tank,
   a nonflammable gas supplying apparatus for supplying the gas space with nonflammable gases, and
   a pressure control apparatus installed in the vent pipe to operate responsively to a pressure difference between the gas space and ambient atmosphere so as to limit the pressure in the gas space to a predetermined range including ambient atmospheric pressure, wherein
   the pressure control apparatus introduces ambient air outside of the tank into the gas space through the vent pipe when the pressure in the gas space is lower than or equal to a predetermined lower limit by gauge pressure,
   and discharge a gas from the gas space out of the tank through the vent pipe when the pressure in the gas space is higher than or equal to a predetermined upper limit by gauge pressure; and
   wherein
   the pressure control apparatus comprises:
   a vacuum relief valve that is a check valve for allowing a flow of air from outside of the tank to the gas space and for stopping a flow of gas from the gas space to outside of the tank in the vent pipe;
   a pressure relief valve that is a check valve for allowing a flow of gas from the gas space to outside of the tank and for stopping a flow of air from outside of the tank to the gas space in the vent pipe; and
   a valve body for accommodating a valving element of the vacuum relief valve and a valving element of the pressure relief valve, and
   a partition member for partitioning a space inside the valve body into a tank-side space in communication with the gas space and an atmosphere-side space in communication with outside the tank,
   wherein
   the vacuum relief valve and the pressure relief valve are normally closed valves which are closed when the pressure in the gas space is within the predetermined range,
   the vacuum relief valve is open to introduce air outside of the tank into the gas space when the pressure in the gas space is lower than or equal to the predetermined lower limit,
   the pressure relief valve is open to discharge gas from the gas space to outside of the tank when the pressure in the gas space is higher than or equal to the predetermined upper limit,
   the partition member has an inlet port and a outlet port, the inlet port being corresponding to the valving element of the vacuum relief valve and for introducing air from the atmosphere-side space into the tank-side space when the valve body being in open position, and the outlet port being corresponding to the valving element of the pressure relief valve and for discharging the gas from the tank-side space to the atmosphere-side space when the valve body being in open position, and
   the vacuum relief valve and the pressure relief valve are configured so that respective valving elements independently pivotally rotate with respect to the partition member responsive to the pressure difference between the tank-side space and the atmosphere-side space.

2. The liquid storage system according to claim 1, wherein the nonflammable gases include a gas whose mass per unit molar number is larger than that of oxygen.

3. The liquid storage system according to claim 2, wherein the nonflammable gases include a gas having a molecular weight larger than that of oxygen.

4. The liquid storage system according to claim 3, wherein the nonflammable gases include a rare gas.

5. The liquid storage system according to claim 1, further comprising,
   a concentration sensor for measuring concentration at least one of oxygen and the nonflammable gas in the gas space.

6. The liquid storage system according to claim 1, wherein the nonflammable gas supplying apparatus comprises:
   a nonflammable gas supply source, a conduit for directing nonflammable gases from the nonflammable gas supply source to the gas space; and a control valve installed in the conduit for controlling supply of the nonflammable gases from the nonflammable gas supply source to the gas space.

7. The liquid storage system according to claim 6, further comprising, a concentration sensor for measuring concentrations of at least one of oxygen and the nonflammable gases in the gas space, wherein the control valve is controlled according to the concentrations of at least one of oxygen and the nonflammable gases measured by the concentration sensor.

8. The liquid storage system according to claim 6, wherein the tank is provided with a level measuring instrument for measuring the level of the liquid fuel stored in the tank; and the control valve is controlled according to the position of the liquid level measured by the level measuring instrument.

9. The liquid storage system according to claim 6, further comprising, a controller for controlling opening and closing of the control valve, wherein the controller controls the control valve to be open, so as to supply the nonflammable gases to the gas space, in any one or combination of following cases including:

a case where the level of the liquid fuel stored in the tank decreases, a case where an oxygen concentration in the gas space is higher than a predetermined normal range, a case where the level of the liquid fuel stored in the tank is lower than a predetermined normal range, and a case where air outside the tank is introduced into the gas space through the vent pipe by the pressure control apparatus.

10. A liquid storage system, comprising:

a tank for storing liquid fuel therein, a vent pipe for providing communication between outside of the tank and a gas space vertically above a level of the liquid fuel in the tank, a nonflammable gas supplying apparatus for supplying the gas space with nonflammable gases, a pressure control apparatus installed in the vent pipe to operate responsively to a pressure difference between the gas space and ambient atmosphere so as to limit the pressure in the gas space to a predetermined range including ambient atmospheric pressure, and a filter disposed on the gas-space side of the vent pipe from the pressure control apparatus, for separating and retaining at least oxygen from the gas in the gas space, wherein the pressure control apparatus introduces ambient air outside of the tank into the gas space through the vent pipe when the pressure in the gas space is lower than or equal to a predetermined lower limit by gauge pressure, and discharge a gas from the gas space out of the tank through the vent pipe when the pressure in the gas space is higher than or equal to a predetermined upper limit by gauge pressure; and the pressure control apparatus comprises:

a vacuum relief valve that is a check valve for allowing a flow of air from outside of the tank to the gas space and for stopping a flow of gas from the gas space to outside of the tank in the vent pipe; and a pressure relief valve that is a check valve for allowing a flow of gas from the gas space to outside of the tank and for stopping a flow of air from outside of the tank to the gas space in the vent pipe;

wherein the vacuum relief valve and the pressure relief valve are normally closed valves which are closed when the pressure of the gas space is within the predetermined range;

the vacuum relief valve is open to introduce air outside of the tank into the gas space when the pressure in the gas space is lower than or equal to the lower limit, and the pressure relief valve is open to discharge gas from the gas space to outside of the tank when the pressure in the gas space is higher than or equal to the upper limit.

11. The liquid storage system according to claim 10, wherein the filter has an oxygen absorber that adsorbs oxygen contained in the gas in the vent pipe.

12. The liquid storage system according to claim 10, wherein the filter has a moisture absorber that adsorbs moisture contained in the gas in the vent pipe.

* * * * *